(12) United States Patent
Liu

(10) Patent No.: US 10,594,147 B2
(45) Date of Patent: Mar. 17, 2020

(54) INTERFACE-ADAPTING DEVICE AND INTERFACE-ADAPTING METHOD

(71) Applicants: Inventec (Pudong) Technology Corporation, Shanghai (CN); INVENTEC CORPORATION, Taipei (TW)

(72) Inventor: Ming-Yuan Liu, Taipei (TW)

(73) Assignees: Inventec (Pudong) Technology Corporation, Shanghai (CN); INVENTEC CORPORATION, Taipei (TW)

( * ) Notice: Subject to any disclaimer, the term of this patent is extended or adjusted under 35 U.S.C. 154(b) by 583 days.

(21) Appl. No.: 15/473,594

(22) Filed: Mar. 29, 2017

(65) Prior Publication Data

US 2018/0152034 A1 May 31, 2018

(30) Foreign Application Priority Data

Nov. 25, 2016 (CN) .......................... 2016 1 1055467

(51) Int. Cl.
*H02J 7/00* (2006.01)
*G06F 1/26* (2006.01)

(52) U.S. Cl.
CPC .............. *H02J 7/0045* (2013.01); *G06F 1/26* (2013.01); *G06F 1/266* (2013.01); *H02J 7/0052* (2013.01); *H02J 2007/0001* (2013.01); *H02J 2007/0062* (2013.01); *H02J 2007/0096* (2013.01)

(58) Field of Classification Search
CPC ................... H02J 7/0045; H02J 7/0052; H02J 2007/0001; H02J 2007/0062; H02J 2007/0096; G06F 1/266; G06F 1/26; G06F 13/382

USPC ......................................................... 320/107
See application file for complete search history.

(56) References Cited

U.S. PATENT DOCUMENTS

| 6,007,373 | A   | * | 12/1999 | Chew ................. | H01R 13/6675 |
| --- | --- | --- | --- | --- | --- |
|           |     |   |         |                      | 439/500 |
| 8,949,634 | B2  | * | 2/2015  | Sakagami ............. | G06F 1/3203 |
|           |     |   |         |                      | 365/227 |
| 9,287,702 | B2  | * | 3/2016  | Proefrock ............... | G06F 1/266 |
| 9,634,502 | B2  | * | 4/2017  | Von Novak, III .... | H02J 7/0044 |
| 9,727,109 | B2  | * | 8/2017  | Hundal ............... | G06F 13/4282 |
| 10,317,922 | B2 | * | 6/2019  | Park ........................ | G05F 1/625 |
| 10,389,147 | B2 | * | 8/2019  | Jung ................. | H02J 7/0029 |
| 2009/0174366 | A1 | * | 7/2009 | Ahmad ................. | H02J 7/0055 |
|           |     |   |         |                      | 320/114 |
| 2017/0133862 | A1 | * | 5/2017 | Jung ................. | H01M 10/4257 |

(Continued)

*Primary Examiner* — M Baye Diao
(74) *Attorney, Agent, or Firm* — CKC & Partners Co., LLC

(57) ABSTRACT

An interface-adapting device includes an OTG (on-the-go) adapting interface and a voltage-dividing module. The OTG adapting interface is configured to connect an electronic device to an expanding device or to an external power source. The voltage-dividing module is configured to receive an input voltage of the electronic device. When the OTG adapting interface is configured to connect the electronic device to the expanding device, the voltage-dividing module transmits a ground voltage to the electronic device; when the OTG adapting interface is configured to connect the electronic device to the external power source, the voltage-dividing module transmits a divided voltage to the electronic device, so that the external power source is configured to charge the electronic device.

10 Claims, 3 Drawing Sheets

(56) References Cited

U.S. PATENT DOCUMENTS

2017/0364466 A1* 12/2017 Gomez Anta ....... G06F 13/4068
2019/0319410 A1* 10/2019 Mondal .......... H03K 19/018507

* cited by examiner

INTERFACE-ADAPTING DEVICE AND INTERFACE-ADAPTING METHOD

RELATED APPLICATIONS

This application claims priority to Chinese Application Serial Number 201611055467.1, filed Nov. 25, 2016, which is herein incorporated by reference.

BACKGROUND

Field of Invention

The present disclosure relates to an adapting device and an adapting method. More particularly, the present disclosure relates to an interface-adapting device and an interface-adapting method.

Description of Related Art

With the rapid development of adapting technology, an interface-adapting device is widely applied in human life and playing an increasingly important role. For example, when a data transmission and reception interface of an electronic device is different from that of an expanding device, an interface-adapting device can be used as an adapting interface to connect the electronic device with the expanding device, so as to expand basic functions of the electronic device. However, currently, an electronic device is unable to be connected to an external power source for charging directly via an interface-adapting device. In other words, a user must remove an interface-adapting device from an electronic device in advance, and then connect the electronic device directly to the external power source for charging. However, this manner may result in unnecessary manpower consumption of a user, so as to reduce quality of user experience while the user uses an interface-adapting device.

Accordingly, a significant challenge is related to ways in which to effectively decrease manpower consumption of a user to use an interface-adapting device while at the same time enhancing quality of user experience associated with designing interface-adapting devices and interface-adapting methods.

SUMMARY

An aspect of the present disclosure is directed to an interface-adapting device. The interface-adapting device includes an OTG (on-the-go) adapting interface. The OTG adapting interface is configured to connect an electronic device to an expanding device or to an external power source. The voltage-dividing module is configured to receive an input voltage of the electronic device. When the OTG adapting interface is configured to connect the electronic device to the expanding device, the voltage-dividing module transmits a ground voltage to the electronic device; when the OTG adapting interface is configured to connect the electronic device to the external power source, the voltage-dividing module transmits a divided voltage to the electronic device, so that the external power source is configured to charge the electronic device.

Another aspect of the present disclosure is directed to an interface-adapting method applied to an interface-adapting device. The interface-adapting device includes an OTG adapting interface and a voltage-dividing module. The interface-adapting method includes steps as follows: connecting an electronic device to an expanding device or to an external power source via the OTG adapting interface; when the electronic device is connected to the expanding device via the OTG adapting interface, transmitting a ground voltage to the electronic device via the voltage-dividing module; and when the electronic device is connected to the external power source via the OTG adapting interface, transmitting a divided voltage to the electronic device via the voltage-dividing module, so as to charge the electronic device via the external power source.

It is to be understood that the foregoing general description and the following detailed description are by examples, and are intended to provide further explanation of the invention as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1A:
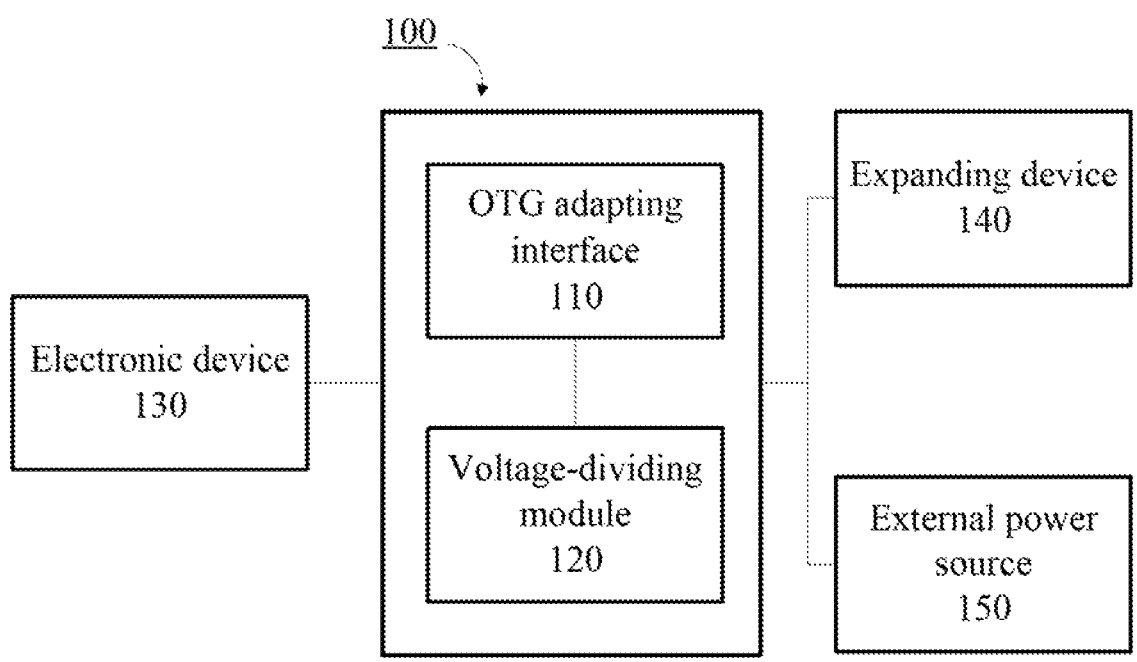
FIG. 1A is a block schematic diagram of an interface-adapting device according to embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1A is a block schematic diagram of an interface-adapting device 100 according to embodiments of the present disclosure. As shown in FIG. 1A, the interface-adapting device 100 includes an OTG (On-The-Go) adapting interface 110 and a voltage-dividing module 120. The OTG adapting interface is configured to connect an electronic device 130 to an expanding device 140 or with an external power source 150. The voltage-dividing module 120 is configured to receive an input voltage of the electronic device 130. For example, the electronic device 130 can be implemented by a smart phone, a tablet computer or any mobile electronic device; the expanding device 140 can be implemented by a flash drive, a mouse, a keyboard or any device which can be configured to expand basic functions of the electronic device 130.

When the OTG adapting interface 110 is configured to connect the electronic device 130 to the expanding device 140, the voltage-dividing module 120 transmits a ground voltage to the electronic device 130; when the OTG adapting interface 110 is configured to connect the electronic device 130 to the external power source 150, the voltage-dividing module 120 transmits a divided voltage to the electronic device 130, so that the external power source 150 is configured to charge the electronic device 130. For example, when a user selectively connects the electronic device 130 to the expanding device 140 and to the external power source 150 via the OTG adapting interface 110, the voltage-dividing module 120 can transmit a corresponding voltage (such as, the ground voltage or the divided voltage) to the electronic device 130, so as to trigger the electronic device 130 to execute corresponding operations.

Figure 1B:
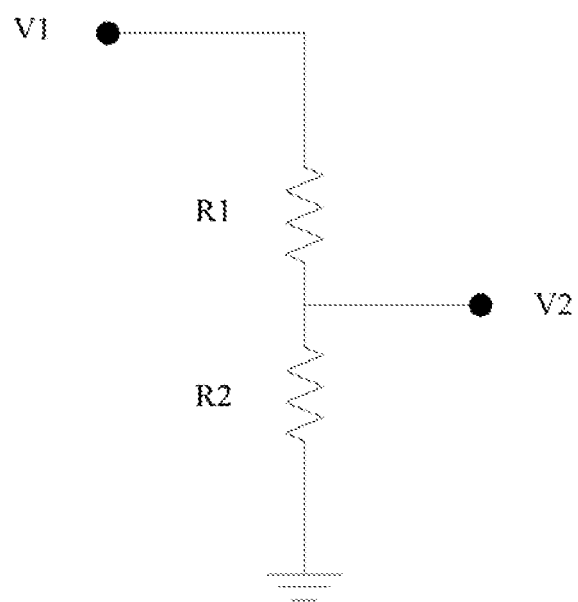
FIG. 1B is a schematic diagram of a voltage-dividing module according to embodiments of the present disclosure.

In one embodiment, reference is now made to FIG. 1B, and FIG. 1B is a schematic diagram of a voltage-dividing module 120 according to embodiments of the present disclosure. As shown in FIG. 1B, the voltage-dividing module 120 includes a first resistor R1 and a second resistor R2, and the first resistor R1 is connected to the second resistor R2 in series. When the OTG adapting interface 110 is configured to connect the electronic device 130 to the external power source 150, the voltage-dividing module can divide an input voltage V1 of the electronic device 130 according to the first resistor R1 and the second resistor R2, so as to generate and transmit a divided voltage V2

$$\left(\text{that is, } \frac{R2}{R1+R2} \cdot V1\right)$$

to the electronic device 130.

In one embodiment, after the electronic device 130 receives the ground voltage, the electronic device 130 enable a power-supply mode to supply power for the expanding device 140. In another embodiment, when the electronic device 130 enables the power-supply mode, data transmission and data reception are continuously executed between the electronic device 130 and the expanding device 140. For example, after a user connects the electronic device 130 to the expanding device 140 via the OTG adapting interface 110, and the voltage-dividing module 120 transmits the ground voltage to the electronic device 130, the electronic device 130 can automatically enable the power-supply mode to supply power for the expanding device 140, thus the expanding device 140 can operate to receive data from the electronic device 130 (such as, receive and store data transmitted from the electronic device 130 via a flash drive), or a user can input commands to control the electronic device 130 via the expanding device 140 (such as, input commands to the electronic device 130 via a mouse or a keyboard), so as to expand basic functions of the electronic device 130.

In one embodiment, after the electronic device 130 receives the divided voltage, the electronic device 130 enables a power-charge mode to trigger the external power source 150 to charge the electronic device 130. For example, after a user connects the electronic device 130 to the external power source 150 via the OTG adapting interface 110, and the voltage-dividing module 120 transmits the divided voltage to the electronic device 130, the electronic device 130 can automatically enable the power-charge mode to trigger the external power source 150, thus the external power source 150 can charge the electronic device 130, so as to extend operational time of the electronic device 130.

In another embodiment, when the electronic device 130 enables the power-charge mode, data transmission and data reception are stopped between the electronic device 130 and the expanding device 140. For example, a user can simultaneously connect the electronic device 130 to the expanding device 140 and the external power source 150 via the OTG adapting interface 110. However, when the electronic device 130 enables the power-charge mode, the electronic device 130 can merely receive power supplied from the external power source 130 for charging, and cannot supply power for the expanding device 140 to execute the data transmission and the data reception with the expanding device 140 at the same time.

In one embodiment, each of the electronic device 130 and the expanding device 140 includes a universal serial bus (USB) interface, and the OTG adapting interface 110 is configured to connect the electronic device 130 with the expanding device 140 via the universal serial bus interfaces of the electronic device 130 and the expanding device 140. For example, when the electronic device 130 includes the universal serial bus interface, the electronic device 130 can transmit the input voltage V1 to the voltage-dividing module 120 via a first pin of the universal serial bus interface, and receive the ground voltage or the divided voltage V2 via a second pin of the universal serial bus interface. It should be noted that, the embodiments mentioned above are used for illustrating some possible manners of implementing the electronic device 130, and the present disclosure is not limited thereto. For example, a data transmission and data reception interface supported by the electronic device 130 and the expanding device 140 can be adjusted according to practical requirements correspondingly.

Figure 2:
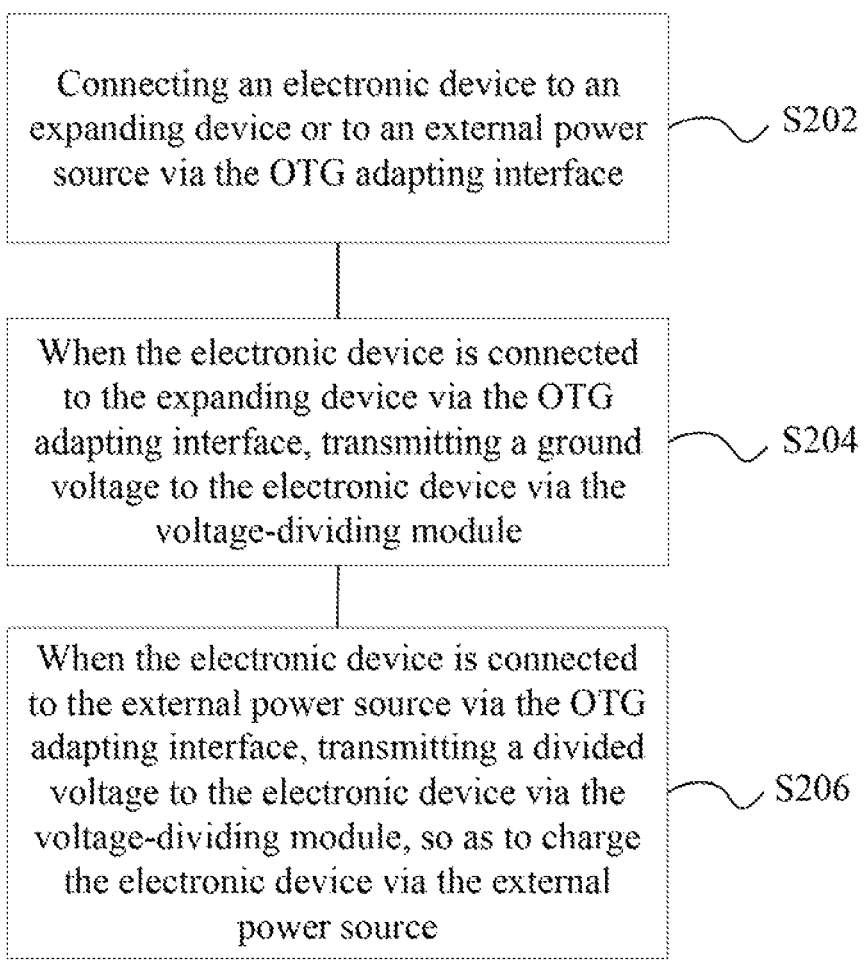
FIG. 2 is a flow chart of an interface-adapting method according to embodiments of the present disclosure.

FIG. 2 is a flow chart of an interface-adapting method 200 according to embodiments of the present disclosure. In one embodiment, the interface-adapting method 200 can be implemented by the interface-adapting device 100 mentioned above, but the present disclosure is not limited thereto. For facilitating of understanding the interface-adapting method 200, the interface-adapting device 100 is used as an example for illustrating the interface-adapting method 200 as follows. As shown in FIG. 2, the interface-adapting method 200 includes steps as follows:

S202: connecting the electronic device 130 to an expanding device 140 or to an the external power source 150 via the OTG adapting interface 110;

S204: when the electronic device 130 is connected to the expanding device 140 via the OTG adapting interface 110, transmitting a ground voltage to the electronic device 130 via the voltage-dividing module 120; and S206: when the electronic device 130 is connected to the external power source 150 via the OTG adapting interface 110, transmitting a divided voltage to the electronic device 130 via the voltage-dividing module 120, so as to charge the electronic device 130 via the external power source 150.

For example, when a user connects the electronic device 130 to the expanding device 140 or to the external power source 150 via the OTG adapting interface 110, the interface-adapting method 200 can be performed by the voltage-dividing module 120 to transmit a corresponding voltage (such as, the ground voltage or the divided voltage) to the electronic device 130, so as to trigger the electronic device 130 to execute corresponding operations. Additionally, possible manners of implementing the voltage-dividing module 120 described in the interface-adapting method 200 are illustrated by the above-mentioned embodiments in detail, so theses will not be repeated.

In one embodiment, after the electronic device 130 receives the ground voltage, the interface-adapting method 200 can be performed by the electronic device 130 to enable a power-supply mode to supply power for the expanding device 140. In another embodiment, when the interface-adapting method 200 is performed by the electronic device 130 to enable the power-supply mode, data transmission and data reception are continuously executed between the electronic device 130 and the expanding device 140. Possible cooperation manners between the electronic device 130 and the expanding device 140 under the power-supply mode are illustrated by the above-mentioned embodiments in detail, so these will not be repeated.

In one embodiment, after the electronic device 130 receives the divided voltage, the interface-adapting method 200 can be performed by the electronic device 130 to enable a power-charge mode to trigger the external power source 150 to charge the electronic device 130. Possible cooperation manners between the electronic device 130 and the external power source 150 under the power-charge mode are illustrated by the above-mentioned embodiments in detail, so these will not be repeated.

In another embodiment, when the interface-adapting method 200 is performed by the electronic device 130 to enable the power-charge mode, data transmission and data reception are stopped between the electronic device 130 and the expanding device 140. For example, a user can simultaneously connect the electronic device 130 to the expanding device 140 and the external power source 150 via the OTG adapting interface 110. However, when the electronic device 130 enables the power-charge mode, the electronic device 130 can merely receive power supplied from the external power source 130 for charging, and cannot supply power for the expanding device 140 to execute the data transmission and the data reception with the expanding device 140 at the same time.

In the embodiments mentioned above, the interface-adapting device and the interface-adapting method of the present disclosure selectively connect the electronic device to the expanding device and to the external power source via the OTG adapting interface, and transmit a corresponding voltage to the electronic device according to operations of the OTG adapting interface mentioned above via the voltage-dividing module, so as to trigger the electronic device to execute corresponding operations. For example, when the OTG adapting interface connects the electronic device to the expanding device, the voltage-dividing module transmits the ground voltage to the electronic device, so as to trigger the electronic device to enable the power-supply mode; when the OTG adapting interface connects the electronic device to the external power source, the voltage-dividing module transmits the divided voltage to the electronic device according to the input voltage, so as to trigger the electronic device to enable the power-charge mode. Accordingly, the interface-adapting device and the interface-adapting method of the present disclosure can support a user to connect the electronic device to the external power source for charging directly via the OTG adapting interface, so as to effectively decrease manpower consumption while a user uses the interface-adapting device and enhance quality of user experience.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the present disclosure. In view of the foregoing, it is intended that the present invention cover modifications and variations of this present disclosure provided they fall within the scope of the following claims.

What is claimed is:

1. An interface-adapting device, comprising:
an OTG (on-the-go) adapting interface, configured to connect an electronic device to an expanding device or to an external power source; and
a voltage-dividing module, configured to receive an input voltage of the electronic device, wherein when the OTG adapting interface is configured to connect the electronic device to the expanding device, the voltage-dividing module transmits a ground voltage to the electronic device; when the OTG adapting interface is configured to connect the electronic device to the external power source, the voltage-dividing module transmits a divided voltage to the electronic device, so that the external power source is configured to charge the electronic device.

2. The interface-adapting device of claim 1, wherein after the electronic device receives the ground voltage, the electronic device enables a power-supply mode to supply power for the expanding device; after the electronic device receives the divided voltage, the electronic device enables a power-charge mode to trigger the external power source to charge the electronic device.

3. The interface-adapting device of claim 2, wherein when the electronic device enables the power-supply mode, data transmission and data reception are continuously executed between the electronic device and the expanding device.

4. The interface-adapting device of claim 2, wherein when the electronic device enables the power-charge mode, data transmission and data reception are stopped between the electronic device and the expanding device.

5. The interface-adapting device of claim 1, wherein each of the electronic device and the expanding device comprises a universal serial bus interface, and the OTG adapting interface is configured to connect the electronic device with the expanding device via the universal serial bus interfaces of the electronic device and the expanding device.

6. An interface-adapting method, applied to an interface-adapting device, wherein the interface-adapting device comprises an OTG adapting interface and a voltage-dividing module, and the interface-adapting method comprises:
connecting an electronic device to an expanding device or to an external power source via the OTG adapting interface;
when the electronic device is connected to the expanding device via the OTG adapting interface, transmitting a ground voltage to the electronic device via the voltage-dividing module; and
when the electronic device is connected to the external power source via the OTG adapting interface, transmitting a divided voltage to the electronic device via the voltage-dividing module, so as to charge the electronic device via the external power source.

7. The interface-adapting method of claim 6, further comprising:
   after the electronic device receives the ground voltage, enabling a power-supply mode to supply power for the expanding device via the electronic device.

8. The interface-adapting method of claim 7, further comprising:
   when the power-supply mode is enabled via the electronic device, data transmission and data reception are continuously executed between the electronic device and the expanding device.

9. The interface-adapting method of claim 6, further comprising:
   after the electronic device receives the divide voltage, enabling a power-charge mode via the electronic device to trigger the external power source to charge the electronic device.

10. The interface-adapting method of claim 9, further comprising:
    when the power-charge mode is enabled via the electronic device, data transmission and data reception are stopped between the electronic device and the expanding device.

* * * * *